United States Patent

[11] 3,550,953

| | | |
|---|---|---|
| [72] | Inventor | Eric W. Neale<br>Birmingham, England |
| [21] | Appl. No. | 754,256 |
| [22] | Filed | Aug. 21, 1968 |
| [45] | Patented | Dec. 29, 1970 |
| [73] | Assignee | Hallam, Sleigh & Cheston Limited<br>Birmingham, England<br>a British company |
| [32] | Priority | Aug. 23, 1967 |
| [33] | | Great Britain |
| [31] | | No. 38720/67 |

[54] SEATS
4 Claims, 8 Drawing Figs.

[52] U.S. Cl. .................................................. 297/312,
297/284, 297/338, 297/201, 297/434
[51] Int. Cl. ....................................................... B60n 1/02,
A47c 1/034
[50] Field of Search ............................................ 297/312,
423, 201, 429, 434, 435, 338; 5/69

[56] References Cited
UNITED STATES PATENTS

| | | | | |
|---|---|---|---|---|
| 572,062 | 11/1896 | Peck .............................. | | 297/201 |
| 616,178 | 12/1898 | Barron .......................... | | 297/201 |
| 2,124,602 | 7/1938 | Bardaji ........................ | | 5/69 |
| 3,173,722 | 3/1965 | Carbonetti .................... | | 297/423 |
| 3,446,532 | 5/1969 | Cramer ......................... | | 297/337 |
| FOREIGN PATENTS | | | | |
| 6,533 | 1896 | Great Britain ................ | | 297/201 |

Primary Examiner—Francis K. Zugel
Attorney—Richards & Geier

ABSTRACT: A seat is provided with pair of height-variable leg-supporting portions, one for each leg. Spring means provide spring action to counterbalance the weight placed upon each leg-supporting portion by the occupant of the seat. Each leg-supporting portion is movable downwardly against the spring action and upwardly by spring action so that the leg-supporting portions move up and down independently of each other to allow up and down leg movement of the occupant of the seat. Means are provided for independent adjustment of the force of the spring action on each leg-supporting portion. Each leg-supporting portion forms a part of an angularly movable member connected to a fixed lower part of the seat by pivotal link means. These pivoted link means are located forward of a pivotal axis about which the angularly movable member turns. This pivotal axis is located transversely of the seat and moves in the fore-and-aft direction of the seat when the respective leg-supporting member moves upwards or downwards.

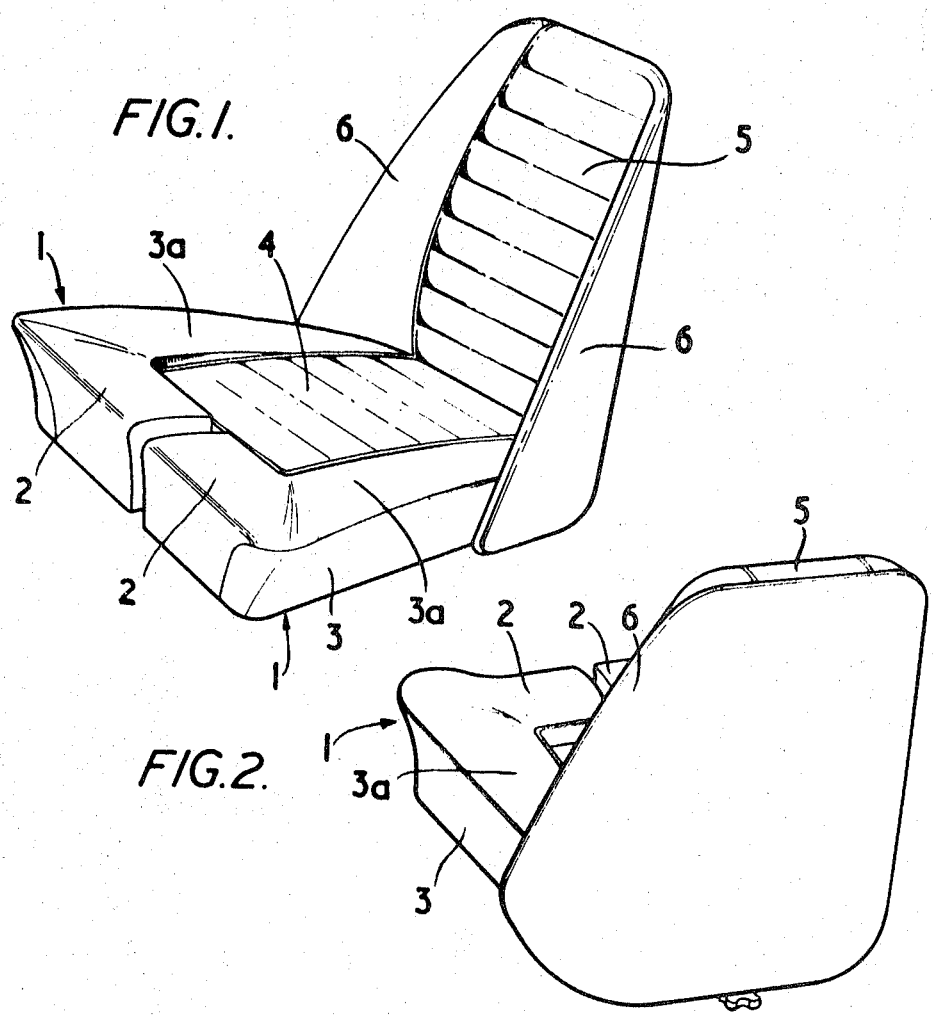
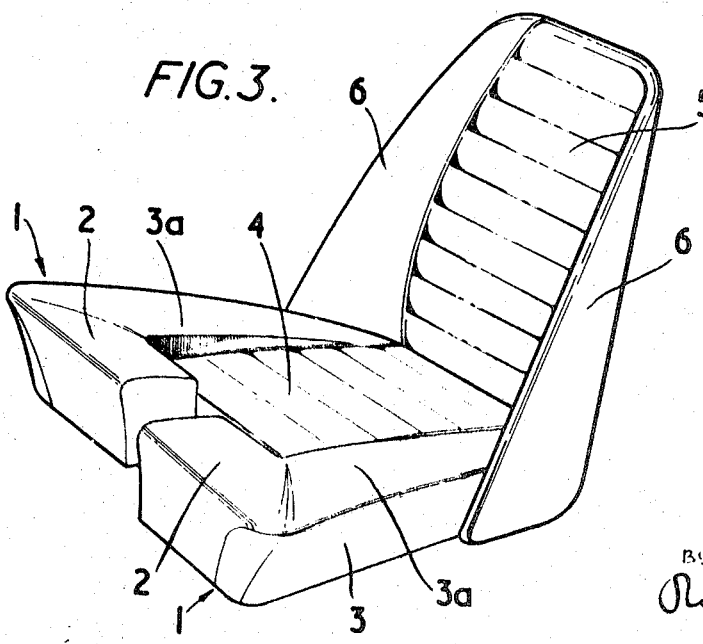

INVENTOR:
E. W. Neale

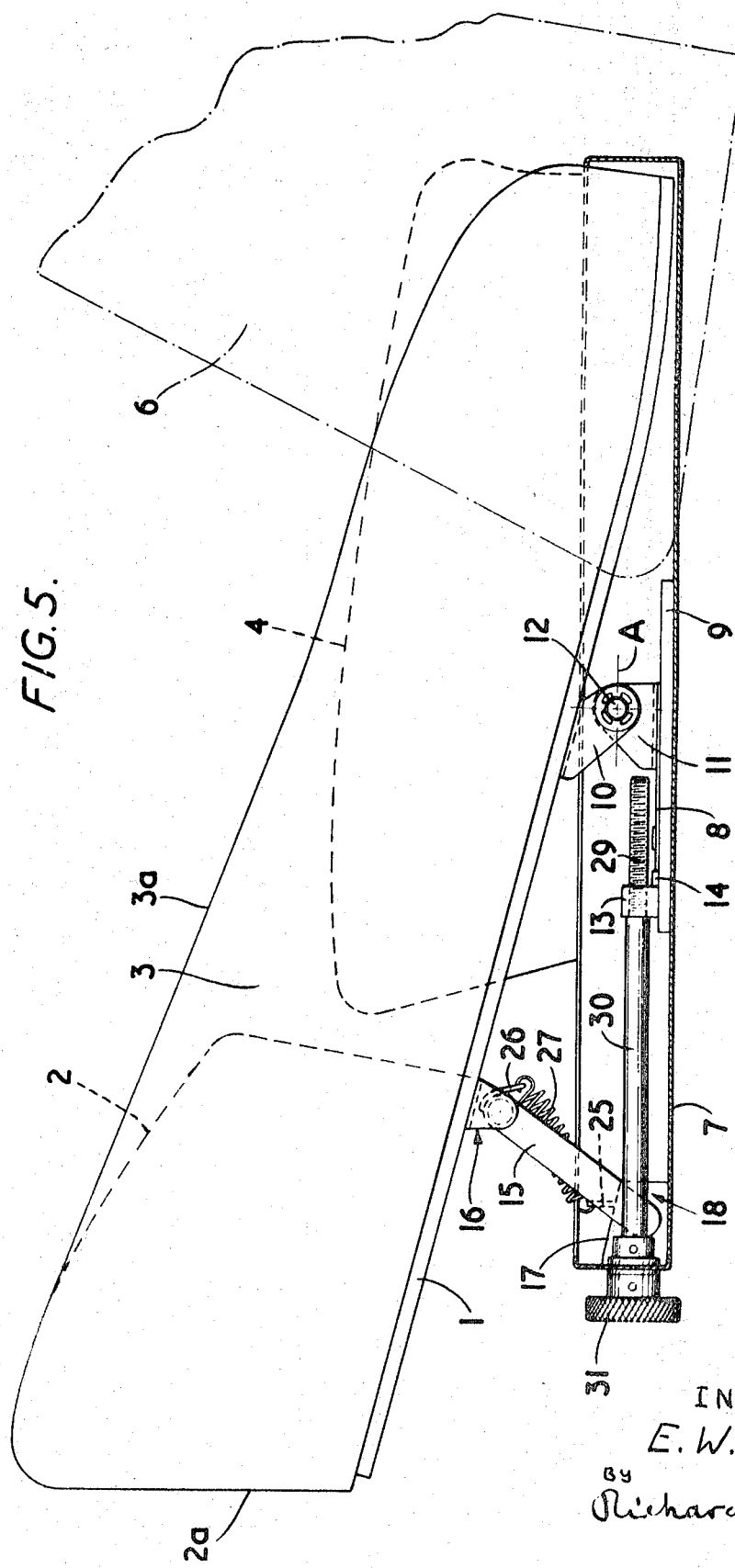

PATENTED DEC 29 1970
3,550,953
SHEET 4 OF 4
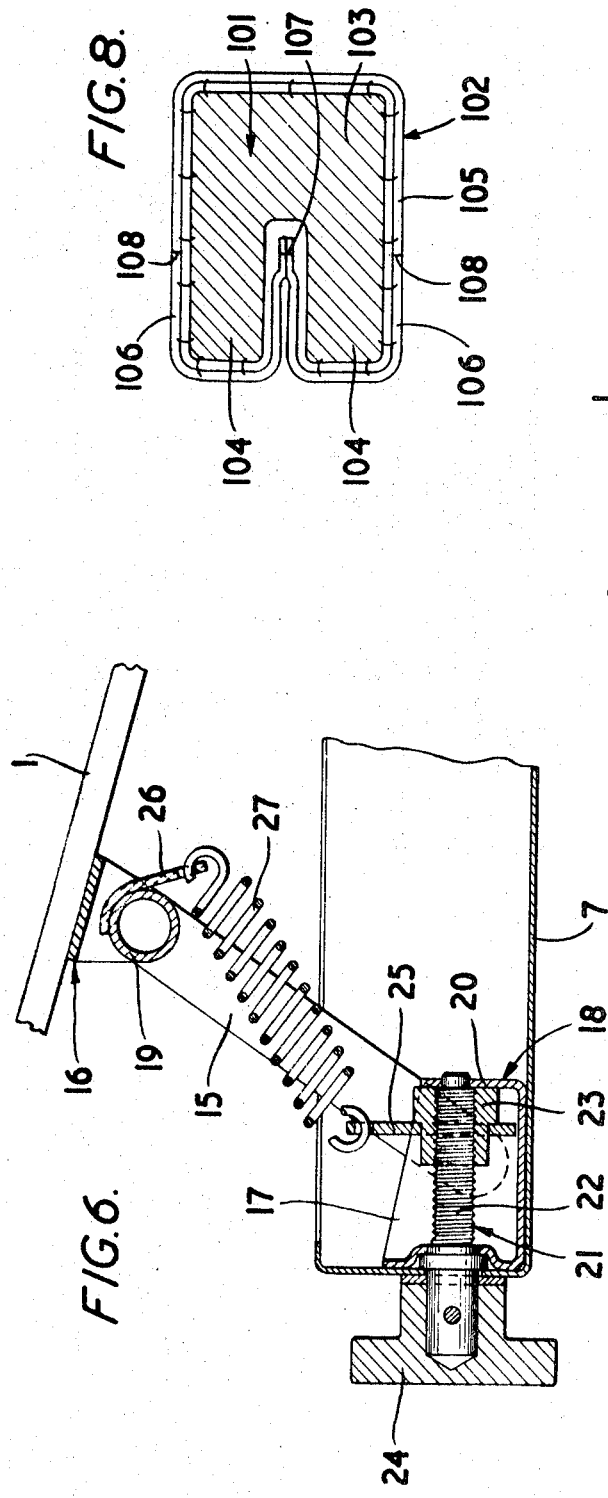
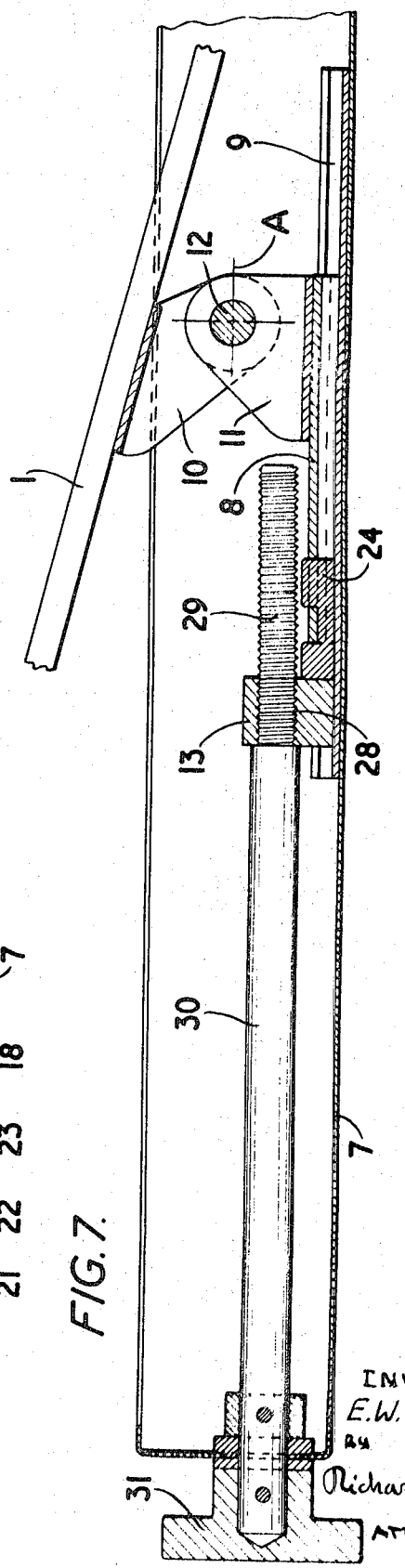
INVENTOR
E.W. Neale
BY
Richards & Geier
ATTORNEYS

SEATS

This invention relates to seats. It is more particularly applicable to driving seats for motor vehicles, but it is also applicable to seats for other purposes, for example to domestic armchairs, or to seating for disabled persons.

According to the invention, in a seat, for example a driving seat for a motor vehicle, the seat proper has a pair of height variable leg-supporting portions, one for each leg, each of said leg-supporting portions being, independently of the other, movable downwards against, and upwards by, respective spring action for counterbalancing the weight placed on said leg-supporting portion by the occupant of the seat, whereby said leg-supporting portions move up and down independently of each other to follow up and down leg movement of the occupant of the seat. Means are provided for individual adjustment of the force of the spring action on each leg-supporting portion. The provision whereby the leg-supporting portions move up and down independently of each other to follow up and down leg movement of the seat occupant contributes, in the case where the seat is a motor vehicle driving seat, to the comfort of the driver whilst he is operating foot controls. Moreover, as there are provided means for independent adjustment of the force of the spring action on each leg-supporting portion, the spring action on one of the leg-supporting portions can thereby be increased in strength relatively to the spring action on the other of said portions, whereby, when the two portions are under an equal weight load, the first mentioned of the leg-supporting portions takes up a higher counterbalanced position than the other of the said leg-supporting portions. This later provision is advantageous, for example, in the case where the seat is a motor vehicle driving seat and the driver normally has one leg withdrawn somewhat relatively to the other (for example he may have his right leg, which may have to operate an accelerator pedal for most of the driving time, withdrawn more than his left leg, with which he may operate a clutch pedal). In such a case, the driver can, by means of the adjusting means referred to, increase the strength of the spring action on the leg-supporting portion for that leg which is normally withdrawn relatively to the other, thereby giving better support to his said normally withdrawn leg. Such provision for spring force adjustment can also be advantageous in the case where the seat is for use by a disabled person. A further advantage of provision of the spring force adjustment is that the spring force can be adjusted to suit the weight of the occupant.

FIGS. 1 to 7 of the accompanying drawings show by way of example, a motor vehicle driving seat constituting a particular embodiment of the invention, and in said FIGS.;

FIG. 1 is a front perspective view of the seat, showing leg-supporting portions at the same height;

FIG. 2 is a rear perspective view of the seat;

FIG. 3 is a front perspective view showing the leg-supporting portions at different heights;

FIG. 5 is a side elevation, on the same scale as FIG. 4, of the seat proper and the counterbalancing and height-adjustment mechanism;

FIG. 6 shows, on a larger scale, a counterbalancing spring and an associated screw device for adjusting the spring strength;

FIG. 7 shows on the same scale as FIG. 6, screw-operated height-adjustment mechanism for adjusting the position taken up by the associated leg-supporting member when the seat is unoccupied;

FIG. 8 illustrates diagrammatically and by way of example; a modified embodiment constructed in accordance with the invention.

Figure 4:
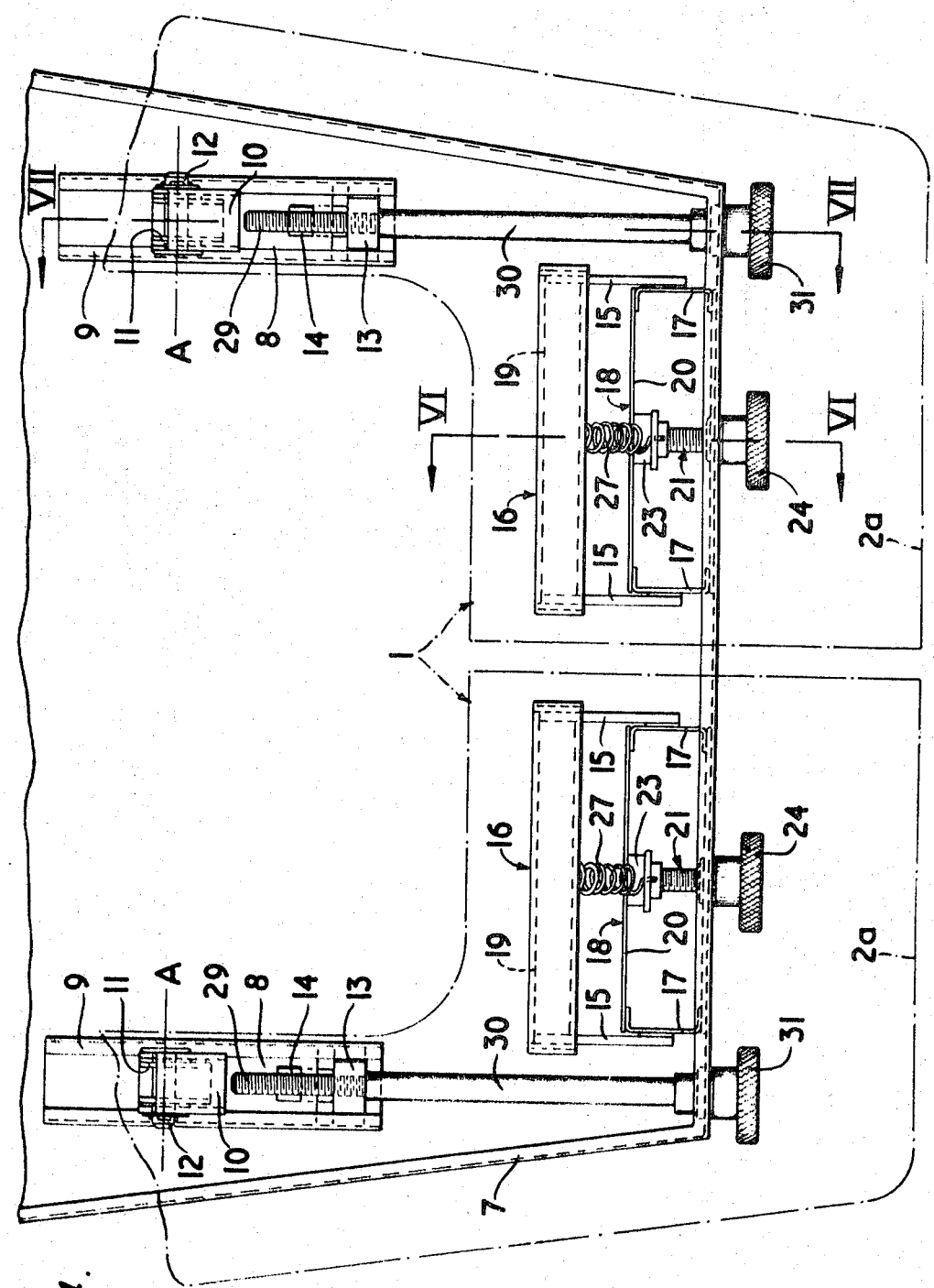
FIG. 4 is a plan view, on a larger scale, showing counterbalancing and height-adjustment mechanism for the leg-supporting portions.

Referring to FIGS. 1 to 7 of the drawings, the motor vehicle driving seat shown therein has the seat proper provided with a pair of upholstered members 1 which are substantially L-shaped in plan, these L-shaped members having transversely directed front portions 2 which extend towards each other and constitute leg-supporting portions providing underneath support for the thighs of the user, and there being one of said leg-supporting portions 2 for each leg of the user. The L-shaped members 1 have rearwardly directed side portions 3, which form rear extensions of the respective leg-supporting portions 2 and which flank opposite sides of a main upholstered part 4 of the seat proper, said side portions 3 having top faces 3a sloping down towards the part 4 and providing lateral support for the thighs of the user. The seat also has an upholstered back 5 with side wings 6; and a relatively fixed base 7. (FIGS. 4 to 7). Each L-shaped member 1 is angularly movable up and down, independently of the other member 1, about a respective horizontal transverse pivotal axis A disposed below the side portion 3 of the member 1. The said member 1 is pivotally connected, at said respective axis A, to a slide 8 slidable within a guide channel 9 fixed to the base 7, the pivotal connection between the member 1 and slide plate 8 comprising a depending bracket 10, carried by the underside of the member 1, upstanding cheeks 11 carried by the slide 8, and a pivot pin 12 engaged through registering bearing holes in the bracket 10 and cheeks 11. A stop 13 limits the forward movement of the slide 8 and the said slide has a soft rubber buffer 14 (FIG. 7) for cushioning impact of the slide 8 on the said stop 13. The L-shaped member 1 is, forwards of the pivotal axis, A connected to the base 7 of the seat by pivoted link means comprising a pair of parallel links 15 pivoted at their upper ends to a bracket 16 on the underside of the member 1, and at their lower ends to upstanding side parts 17 of a box-member 18 rigid with the base 7. A spacer 19 spaces the upper ends of the links 15. Journaled in a front wall of the base 7, and extending rearwards as far as, and journaled in, a rear wall 20 of the box-member 19, is an adjustment screw 21 formed with an external screw thread 22 operatively engaged with an internally screw-threaded nut 23. The screw 22, which cannot move axially, carries at its front end, forwards of the front wall of the base 7, a knurled operating knob 24. The nut 23 is fitted with an upstanding plate 25 (FIG. 6) which, with the nut 23, moves axially of the screw 21 when the latter is rotated by the knob 24, and anchored at one end to the said plate 25 and at its other end to an attachment lug 26 secured to the spacer 19 between the links 15 is a coiled tension spring 27 which provides spring action for counterbalancing the weight placed on the respective leg-supporting portion 2. The force of the said spring action is adjustable, independently of the spring action on the other leg-supporting portion 2, by rotating the screw 21 in the appropriate direction to adjust the strength of the spring 27 anchored to the plate 25 on the nut on the said screw.

The arrangement is such that each of the leg-supporting portions 2 is, independently of the other, movable downwards against, and upwards by, the spring action exerted on the respective L-shaped member by the respective spring 27 associated therewith for counterbalancing the weight of the said leg-supporting portion 2, whereby the leg-supporting portions 2 move up and down, independently of each other to follow up and down leg movement, such as when operating accelerator, clutch and brake pedals, of the occupant of the seat, thereby tending to result in a greater degree of comfort to the occupant when driving. As the leg-supporting portions move up and down, the respective L-shaped members 1 move angularly up and down about the pivotal axes A, the respective links 15 also turning angularly and the respective slides 8 sliding horizontally along the channels 9. The effect of the resultant horizontal movement of the axes A during the up and down movement of the respective leg-supporting portions 2 is that the front edges (shown at 2a) of said portions 2 undergo substantially no displacement in a horizontal direction during said movement.

When the seat is unoccupied, the springs 27 act to keep the leg-supporting portions 2 in raised positions, with the slides 8 pressed against the respective stops 13. Provision is made for varying the angular positions taken up by the L-shaped members (and thus the height of the respective leg-supporting member 2) when the seat is unoccupied, and for this purpose each stop 13 is slidably mounted in the respective channel 9 and has an internally screw-threaded bore 28 engaged by an external screw thread 29 on a forwardly extending screw 30 rotatably journaled at its front end in the front wall of the base 7, said front end of the screw carrying an operating knob 31. In order to adjust the angular position taken up by either L-shaped member 1 (independently of that of the other member 1) when the seat is unoccupied, the knob 31 is turned in the appropriate direction to move the stop 13 forwards (whereupon the respective spring 27 acts to move the member 1 further upwards, the slide 8 following the forward movement of the slide 8), or backwards (whereupon the stop pushes the slide backwards to cause the member 1 to move down against the spring action), until the desired new adjusted position is reached. The respective knob 24 controlling the screw 21 can then be turned, if desired, to readjust the strength of the spring 27 to compensate for the change in said spring strength resulting from the aforesaid angular adjustment of the member 1 carried out by turning the knob 31.

The occupant of the seat may find it more convenient, when entering and leaving the seat, if the no-load position of that member 1 which is nearest to the side at which the seat is entered and left is adjusted by turning the respective knob 31, so that said position is lower than the no-load position of the other member 1.

When the seat is occupied, the counterbalanced position taken up by the respective leg-supporting portion 2 when under a given weight load will depend on the adjusted strength of the respective spring 27. Therefore, if, when driving, one leg of the occupant of the seat, for example, a leg-operating accelerator and brake pedals, is normally withdrawn relatively to the other, the occupant can conveniently, with a view to securing greater comfort; adjust, by the screw means controlled by the knob 24, the spring strength so that, when the leg-supporting portions 2 are under an equal weight load, the leg-supporting portion for the said normally withdrawn leg is higher than the other leg-supporting portion. The provision of strength adjustment means for the springs also enables the spring strength to be adjusted to suit the weight of the occupant.

In the modification shown diagrammatically in plan, in FIG. 8, the seat proper comprises a diaphragm or web 101, of rubber or like resilient material, supported at its edges, by hooks or the like, in a peripheral tubular metal frame 102, the said diaphragm or web 101 having a main rear portion 103, and a pair of side by side front portions 104 which extend forwards from, and are integral with, said rear portion 103 and which form two independently height-variable leg-supporting portions. The tubular metal frame 102 comprises a wide rear member 105, which embraces the main rear portion 103 of the diaphragm or web, and a pair of narrower front U-members 106 which face oppositely to the rear U-member and which embrace the respective leg-supporting front portions 104 of the diaphragm or web, one narrower U-member to each front leg-supporting portion. These two narrower U-members 106 are disposed side by side, with one side limb of the one front U-member adjacent one side limb of the other U-member. These two adjacent side limbs of the front U-members are pivoted together at 107 are their ends, whilst the remaining side limbs of said front U-members are pivoted at 108 to the respective ends of the rear U-member 105 of the frame. Springs (not shown) are provided for counterbalancing the weight placed on the respective leg-supporting portions 104 by the occupant, whereby said portions 104 move up and down independently of each other to follow up and down leg movement of the occupant, the material of the diaphragm or web being sufficiently flexible to permit such movement. Means (not shown) are provided for independent adjustment of the force of the spring action on each leg-supporting portion 104.

If desired, the two front portions 104 of the diaphragm or web may be connected together along their adjacent sides by a gusset said gusset being such as to be sufficiently yieldable to allow the independent adjustment of the leg-supporting portion to be effected.

The invention is also applicable to seats for two or more persons. For example, a bench-type vehicle seat for seating two persons may have two pairs, one for each person, of the movable leg-supporting portions; or the movable leg-supporting portions may be provided for only one of the occupants of said bench-type seat.

I claim:

1. A seat, comprising a seat proper having a pair of height-variable leg-supporting portions, one for each leg, each of said leg-supporting portions being movable upwards and downwards independently of the other; spring means for providing respective spring action for counterbalancing the weight placed on each leg-supporting action by the occupant of the seat, each leg-supporting portion being movable downwards against, and upwards by, the respective spring action, whereby said leg-supporting portions move up and down independently of each other to follow up and down leg movement of the occupant of the seat; means for independent adjustment of the force of the spring action on each leg-supporting portion; pivoted link means and a relatively fixed lower part of the seat, each leg-supporting portion being at least a part of an angularly movable member connected to said relatively fixed lower part of the seat by said pivotal link means, said pivotal link means being located forward of a pivotal axis about which said angularly movable member turns, said pivotal axis being disposed transversely of the seat and moving in the fore-and-aft direction of the seat when the respective leg-supporting member moves upwards or downwards, whereby a front edge of said leg-supporting portion undergoes substantially no movement in a horizontal direction during said angular upward and downward movement.

2. A seat, as claimed in claim 1, wherein there are provided respective slide means with each angularly movable member, each angularly movable member being pivotally connected, at its pivotal axis, to the respective slide means and the latter being arranged to slide in the fore-and-aft direction of the seat as the said angularly movable member moves angularly upwards and downwards.

3. A seat, as claimed in claim 2, wherein stop means and a screw device are associated with each slide means, each slide means being slidable up to the respective stop means and the latter being adjustable, in the fore-and-aft direction of the seat, by the respective screw device to vary the angular position taken up by the respective angularly movable member when the seat is unoccupied.

4. A seat, as claimed in claim 3, wherein there are associated with each leg-supporting portion a coiled tension spring, and a screw device adjustable to alter the strength of said spring, said tension spring providing the counterbalancing spring action on said leg-supporting portion and being connected at its one end to the respective angularly movable member and at its other end to the said screw device adjustable to alter the strength of said spring, the screw devices to which the springs are connected constituting means for independent adjustment of the force of the spring action on each leg-supporting portion.